United States Patent Office.

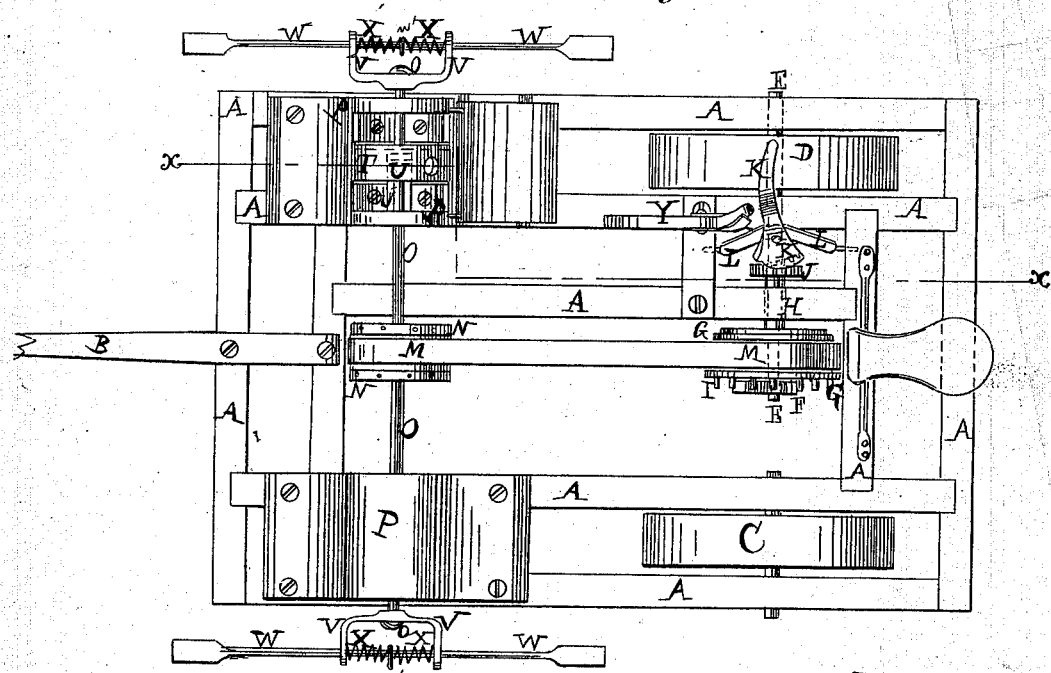
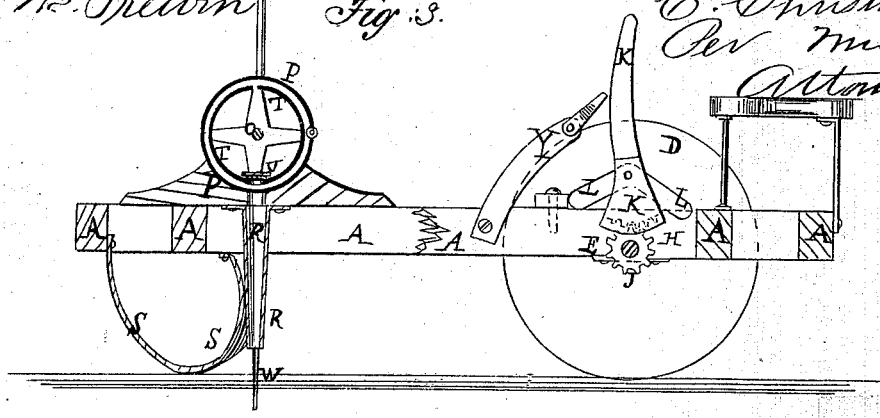

JAMES M. GORDON AND E. CHRISTIANSON, OF ST. JOSEPH, MISSOURI.

Letters Patent No. 71,379, dated November 26, 1867.

IMPROVEMENT IN CORN-PLANTERS.

*The Schedule referred to in these Letters Patent and making part of the same.*

TO ALL WHOM IT MAY CONCERN:

Be it known that we, JAMES M. GORDON and E. CHRISTIANSON, of St. Joseph, in the county of Buchanan, and State of Missouri, have invented a new and useful Improvement in Corn-Planters; and we do hereby declare that the following is a full, clear, and exact description thereof, which will enable others skilled in the art to make and use the same, reference being had to the accompanying drawings, forming part of this specification.

Figure 1 is a top or plan view of our improved machine.

Figure 2 is a detail view of the clutch.

Figure 3 is a detail sectional view of the machine taken through the line $xx$, fig. 1.

Similar letters of reference indicate corresponding parts.

Our invention has for its object to furnish an improved corn-planter, simple in construction, effective and accurate in operation, and which shall mark the hills so that the planting may be done with convenience and dispatch, and without its being necessary to previously mark the ground; and it consists in the combination and arrangement of the various parts of the machine, as hereinafter more fully described.

A is the frame of the machine, to the middle part of the forward end of which the tongue B is attached. C and D are the wheels. The wheel C revolves upon an axle attached to the frame A. The wheel D is rigidly attached to its axle E, which revolves in bearings attached to the frame A, and which has a cross-bar, F, securely attached to its inner end. G is a pulley, rigidly attached to the inner end of the sleeve H, through which the axle E passes. The pulley G has cogs or pins, I, attached to its inner side, which, when the said pulley G is moved inward, take hold of the cross-bar F, causing the pulley G and sleeve H to be carried with the axle E in its revolution. J is a small gear-wheel attached to the outer end of the sleeve H. K is a lever, which is pivoted to the side of the cross-bar L, the ends of which are pivoted to the frame A, so that the lever K may have two movements, one lateral to throw the sleeve H and clutch-pulley G into and out of gear with the bar F and axle E, and the other longitudinal with the frame A, to adjust the dropping-device into proper position to commence the rows. The lower end of the lever K is made circular, and has teeth formed upon it fitting into the teeth of the wheel J, so that by operating the lever K the position of the dropping-device may be adjusted, as required. To the sides of the lower end of the lever K are attached plates, the lower edges of which are made circular, and which project a little below the teeth formed upon the lower end of said lever, so that the said plates may overlap the sides of the gear-wheel J, to enable the lever K by its lateral movement to throw the pulley G and cross-bar F of the axle E into and out of gear with each other. Y is a catch, attached to the frame A in such a position that it may take hold of the lever K when moved into such a position as to throw the pulley G into gear with the bar F of the axle E, and hold it securely in place while the machine is working. M is a band, which passes around the pulley G, and around the pulley N, attached to the middle part of the shaft O, so as to communicate motion from the said pulley G to the said shaft. P are the seed-boxes, which are cylindrical in shape, and have holes through the centre of their lower sides, through which the seed passes to the spouts R, by which it is conducted to the ground directly in the rear of the ploughs or marks S, which are attached to the forward part of the frame A, and which mark or furrow the ground for the reception of the seed, the seed being covered by the advance of the broad wheels C and D, which act as rollers. The shaft O passes through the seed-boxes P, and has wheels, T, attached to it of such a size as to work freely within the seed-boxes P. The wheels T have holes formed through their opposite sides, of such a size as to hold the proper amount of seed to form a hill. U are small plates, attached to the bottoms of the seed-boxes P, which overlap the inner sides of the rims of the said wheels T to prevent any more seed than enough to form a hill from passing into the spouts R. The plates U render it necessary that the spokes of the wheels T should be connected with the rims near one edge, as shown in dotted lines in fig. 1. To the ends of the shaft O, which project beyond the seed-boxes P, at the sides of the machine, are attached bent arms or supports, V, having holes through their ends through which pass the markers W. $w'$ is a projection, formed upon or attached to the central part of the maker-bars W within the arms or ends of the support V. X are coiled wire or equivalent springs, coiled around the bars or markers W, with one end resting against the projections $w'$, and their other ends against the inner sides of the arms or supports V. The marker-bars W are arranged in such a position that they may be in line with the holes in the wheels T, and are of such a length that when the shaft O revolves, the ends of the markers may enter and mark the ground directly opposite the point where the hill is planted, the springs X enabling them to give should they encounter an obstacle. The ends of the markers W are made broad or spade-shaped, as shown in fig. 1, so that the marks made by them may be more readily seen.

We claim as new, and desire to secure by Letters Patent—

1. The combination of the lever K gear-wheel J, sleeve H, and clutch and band-pulley G, with the cross-bar F and axle E, substantially as herein shown and described and for the purpose set forth.

2. The combination of the band M, pulley N, shaft O, and wheels T, with each other and with the pulley G and seed-boxes P, substantially as herein shown and described and for the purpose set forth.

3. The combination of the markers W with the shaft O and wheels T, substantially as herein shown and described and for the purpose set forth.

JAMES M. GORDON,
E. CHRISTIANSON.

Witnesses:
W. W. WILSON,
GEO. M. IRWIN.